US008155088B2

(12) United States Patent
Maaref et al.

(10) Patent No.: US 8,155,088 B2
(45) Date of Patent: *Apr. 10, 2012

(54) SYSTEM AND METHOD FOR OPPORTUNISTIC CELL EDGE SELECTION IN MULTI-CELL MIMO OFDMA NETWORKS

(75) Inventors: Amine Maaref, Cambridge, MA (US); Chun Kin Au Yeung, West Lafayette, IN (US); Koon Hoo Teo, Lexington, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 573 days.

This patent is subject to a terminal disclaimer.

(21) Appl. No.: 12/362,976

(22) Filed: Jan. 30, 2009

(65) Prior Publication Data
US 2010/0197314 A1 Aug. 5, 2010

(51) Int. Cl.
*H04B 7/216* (2006.01)
*H04W 72/00* (2009.01)
(52) U.S. Cl. .................. 370/335; 455/450; 370/342
(58) Field of Classification Search .......... 370/335, 370/338, 342; 375/260–264; 455/410, 411, 455/413, 450–454
See application file for complete search history.

(56) References Cited

U.S. PATENT DOCUMENTS

| | | | |
|---|---|---|---|
| 7,796,997 B2* | 9/2010 | Kim et al. | 455/450 |
| 2007/0086406 A1* | 4/2007 | Papasakellariou | 370/343 |
| 2007/0155377 A1* | 7/2007 | Horiguchi et al. | 455/422.1 |
| 2007/0177501 A1* | 8/2007 | Papasakellariou | 370/229 |
| 2007/0258529 A1* | 11/2007 | Liang et al. | 375/260 |
| 2007/0281700 A1* | 12/2007 | Deguchi et al. | 455/436 |
| 2007/0291702 A1* | 12/2007 | Nanba et al. | 370/336 |
| 2008/0081633 A1* | 4/2008 | Oteri et al. | 455/452.1 |
| 2008/0084818 A1* | 4/2008 | Yoon et al. | 370/210 |
| 2008/0146231 A1* | 6/2008 | Huang et al. | 455/436 |
| 2009/0110087 A1* | 4/2009 | Liu et al. | 375/260 |
| 2009/0124261 A1* | 5/2009 | Shimomura | 455/436 |
| 2009/0201867 A1* | 8/2009 | Teo et al. | 370/329 |
| 2009/0233544 A1* | 9/2009 | Oyman et al. | 455/7 |
| 2009/0245085 A1* | 10/2009 | Tao et al. | 370/208 |
| 2009/0245172 A1* | 10/2009 | Sato | 370/328 |
| 2010/0061469 A1* | 3/2010 | Tao et al. | 375/260 |
| 2010/0110996 A1* | 5/2010 | Tao et al. | 370/329 |
| 2010/0220670 A1* | 9/2010 | Teo et al. | 370/329 |

* cited by examiner

*Primary Examiner* — Thai Hoang
(74) *Attorney, Agent, or Firm* — Dirk Brinkman; Gene Vinokur

(57) ABSTRACT

A method for allocating resources in an orthogonal frequency division multiple access (OFDMA) network, where each cell in the network has a center region and an edge region. The cell center region uses a frequency band orthogonal to the frequency band used by the cell edge region. The frequency band is made up of resource blocks (RBs) or non-overlapping sets of subcarriers. Upon availability of cell-center RBs, cell-center user equipment (UEs) are assigned resource blocks. A fixed number of cell edge regions from a few adjacent cells form a cluster, and only the cell edge regions with the highest achievable throughput rate within each cluster gets to transmit in a given scheduling instance.

18 Claims, 18 Drawing Sheets

|  |  | Sector 1 | | Sector 2 | | Sector 3 | |
|---|---|---|---|---|---|---|---|
|  |  | RB 1 | RB 2 | RB 1 | RB 2 | RB 1 | RB 2 |
| Sector 1 | UE 1 | 2 | 3 | 2 | 3 | 2 | 3 |
| Sector 2 | UE 1 | 2 | 3 | 2 | 2 | 3 | 4 |
|  | UE 2 | 4 | 2 | 4 | 2 | 4 | 2 |
|  | UE 3 | 1 | 2 | 3 | 3 | 3 | 1 |
| Sector 3 | UE 1 | 3 | 2 | 3 | 2 | 2 | 3 |
|  | UE 2 | 3 | 4 | 2 | 2 | 3 | 3 |

FIG. 10

|  |  | Sector 1 | | Sector 2 | | Sector 3 | |
|---|---|---|---|---|---|---|---|
|  |  | RB 1 | RB 2 | RB 1 | RB 2 | RB 1 | RB 2 |
| Sector 1 | UE 1 | 2 | 3 | 2 | 3 | 2 | 3 |
|  | UE 1 | 2 | 3 | 2 | 2 | 3 | 4 |
|  | UE 2 | 4 | 2 | 4 | 2 | 4 | 2 |
| Sector 2 | UE 3 | 1 | 2 | 3 | 3 | 3 | 1 |
| Sector 3 | UE 1 | 3 | 2 | 3 | 2 | 2 | 3 |
|  | UE 2 | 3 | 4 | 2 | 2 | 3 | 3 |

FIG. 11

|          |      | Sector 1 |      | Sector 2 |      | Sector 3 |      |
|----------|------|----------|------|----------|------|----------|------|
|          |      | RB 1     | RB 2 | RB 1     | RB 2 | RB 1     | RB 2 |
| Sector 1 | UE 1 | 2        | 3    | 2        | 3    | 2        | 3    |
| Sector 2 | UE 1 | 2        | 3    | 2        | 2    | 3        | 4    |
|          | UE 2 | 4        | 2    | 4        | 2    | 4        | 2    |
|          | UE 3 | 1        | 2    | 3        | 3    | 3        | 1    |
| Sector 3 | UE 1 | 3        | 2    | 3        | 2    | 2        | 3    |
|          | UE 2 | 3        | 4    | 2        | 2    | 3        | 3    |

FIG. 12

|          |      | Sector 1 |      | Sector 2 |      | Sector 3 |      |
|----------|------|----------|------|----------|------|----------|------|
|          |      | RB 1     | RB 2 | RB 1     | RB 2 | RB 1     | RB 2 |
| Sector 1 | UE 1 | 2        | 3    | 2        | 3    | 2        | 3    |
|          | UE 1 | 2        | 3    | 2        | 2    | 3        | 4    |
| Sector 2 | UE 2 | 4        | 2    | 4        | 2    | 4        | 2    |
|          | UE 3 | 1        | 2    | 3        | 3    | 3        | 1    |
| Sector 3 | UE 1 | 3        | 2    | 3        | 2    | 2        | 3    |
|          | UE 2 | 3        | 4    | 2        | 2    | 3        | 3    |

FIG. 13

SYSTEM AND METHOD FOR OPPORTUNISTIC CELL EDGE SELECTION IN MULTI-CELL MIMO OFDMA NETWORKS

FIELD OF THE INVENTION

This invention relates to reducing interference in a wireless cellular communications network, and more specifically to allocating exclusive resources in multi-cell wireless communication networks.

BACKGROUND OF THE INVENTION

The performance of a cellular network is limited by the amount of inter-cell interference (ICI) experienced by user equipment (UEs). Specifically, UEs at an edge of a cell can experience ICI from adjacent cells at receive power levels similar to that of the receive power from the cell. This is especially true in the case where a frequency reuse factor is one. While a frequency reuse factor of one maximizes a spectral efficiency of the cellular network, the ICI results in a lowering of the signal-to-interference-and-noise (SINR) levels for the UEs at the edges of the cells. Lower SINR for the cell edge UE results in lower transmission rates at any given decoding quality as measured by an error rate.

In orthogonal frequency division multiple access (OFDMA) communication networks, the available spectrum is partitioned into multiple mutually orthogonal groups of subcarriers (frequency bands), often referred to as resource blocks (RBs), i.e., resource units, which are assigned to UEs in each cell in a way that no intra-cell interference occurs as a result of this allocation. Such allocations are usually carried out by a scheduler module that assign a set of RBs to UEs, where those UEs experience high SINR levels so as to maximize the overall network performance and achievable throughput.

The use of multiple-input-multiple-output (MIMO) technology in a cellular network can increase the performance of wireless communication networks. In a MIMO network, a transmitter with $M_T$ transmit antennas transmits data to a receiver with $M_R$ receive antennas, thereby using a total of $M_T \times M_R$ sub-channels.

In a cellular downlink network, where a base station (BS) also referred to as Node-B or eNodeB in some standards such as 3GPP LTE, transmits data to multiple UEs in the cell, MIMO technology can allow the BS to serve multiple UEs simultaneously while using the single set of time-frequency resource units or RBs.

Employing a hard frequency reuse pattern across multiple cells reduces the ICI experienced by the cell-edge UEs. In a cellular network with a frequency reuse factor larger than one, each cell uses only a fraction of the entire spectrum, and thus, the overall achievable throughput can be lowered despite the potential gain resulting from the reduced amounts of ICI. Fractional frequency reuse is a well known variation of hard frequency reuse patterns.

FIG. 1A shows one possible implementation of the frequency spectrum usage in a fractional frequency reuse network with a reuse factor of three. In this network, an available spectrum 102 is partitioned into four non-overlapping parts. One part 104 is used for transmission between the base station and the UEs near the base station (center UEs). The other three parts 106, 108, and 110 are used for transmissions between the base station and the UEs near the edges of a cell (edge UEs).

FIG. 1B shows one such cellular layout that employs fractional frequency reuse with a reuse factor of three. The fill patterns in FIG. 1A correspond to those in FIG. 1B. All cells use spectrum 104 to transmit to UEs in the center region 112 of their respective cells. When transmitting to UEs at the cell edges, each cell uses the set of RBs specifically assigned to it. In FIG. 1B, cell edge UEs for cells 114 are served using spectrum 108. Similarly, cell edge UEs for cells 116 are served using spectrum 106, and cell edge UEs for cells 118 are served using spectrum 110.

As shown in FIG. 1C, fractional frequency reuse can also be applied in a cellular network where each cell has three sectors. Each sector is served using one 120° directional antenna pointing towards the opposite corner of the cell. UEs in the center regions 112 of each sector are still served using the frequency spectrum 104. The edge regions 122, 124, and 126 of the respective cell sectors, are served using frequency spectrum 106, 108, and 110, respectively.

Inter-cell scheduling is described by Choi et al., "The Capacity gain from Intercell Scheduling in Multi-Antenna Systems," IEEE Transactions on Wireless Communications, vol. 7, no. 2, February 2008, page 714-725. A cluster is a group of adjacent cells. In an inter-cell scheduling scheme, the cell with a largest achievable rate is given the opportunity to transmit, while the other cells in the same cluster do not transmit.

Examples of base station cooperation schemes, where each UE receives intended signals from multiple transmitting base stations are described by Zhang et al., "Asynchronous Interference Mitigation in Cooperative Base Station Systems," Transactions on Wireless Communications, vol. 7, no. 1, January 2008, page 155-165.

SUMMARY OF THE INVENTION

Embodiments of the invention provide a method and system for cooperative transmission in a multi-cellular wireless network.

In one embodiment, each cell in the network has a center region and an edge region. The cell center region uses a frequency band orthogonal to the frequency band used by the cell edge region. Upon availability of cell-center RBs, cell-center UEs are assigned resource blocks (RBs). A fixed number of cell edge regions from a few adjacent cells form a cluster, and only the cell edge regions with the highest achievable throughput rate transmit within each cluster.

BRIEF DESCRIPTION OF THE DRAWINGS

FIGS. 10-13 are tables of various allocations of the OCES of FIG. 9 according to some embodiments of the invention.

DETAILED DESCRIPTION OF THE PREFERRED EMBODIMENT

Figure 1A:
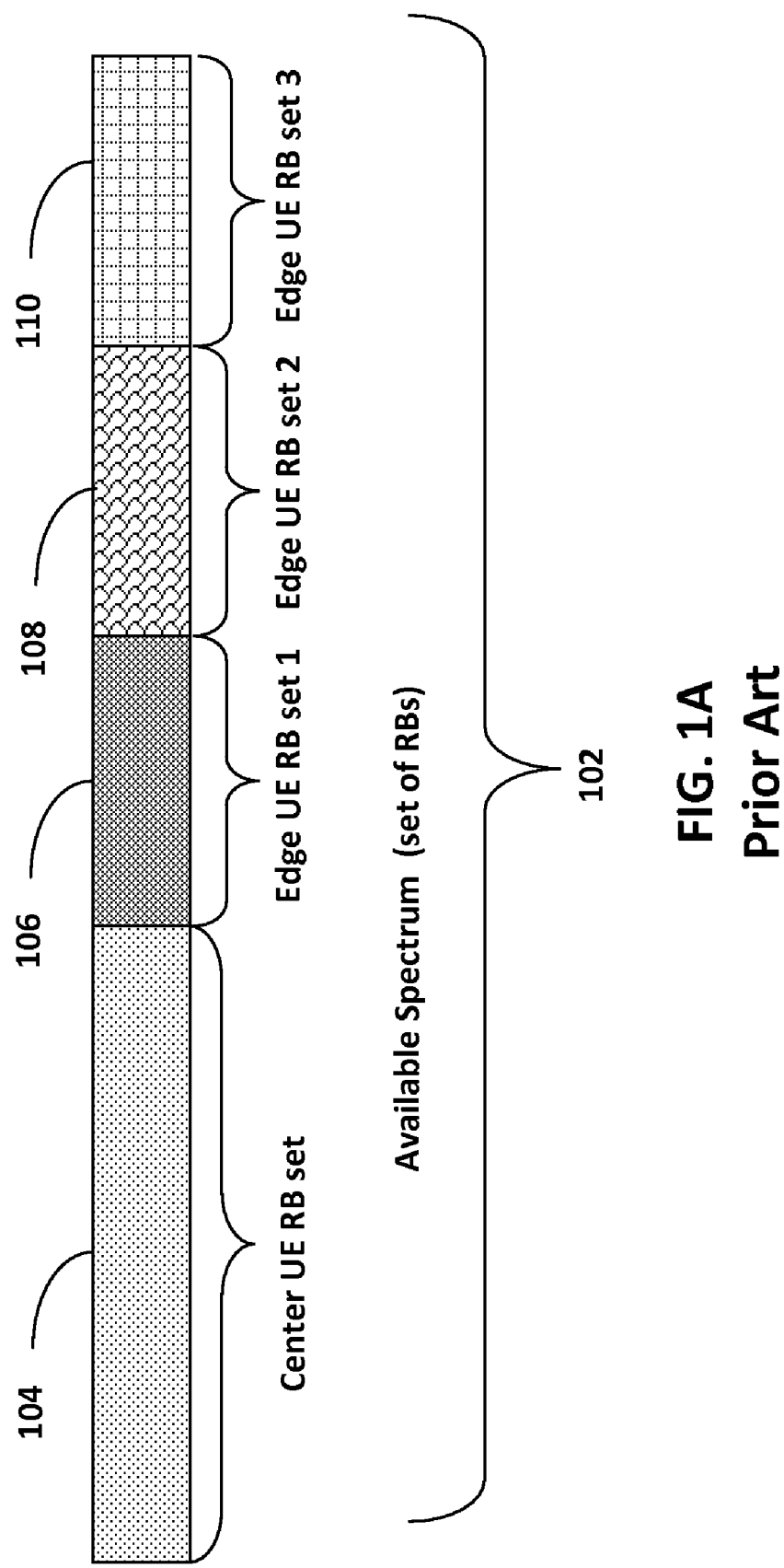
FIG. 1A is a block diagram of frequency spectrum partitioning in a fractional frequency reuse network according to the prior art.
Figure 1B:
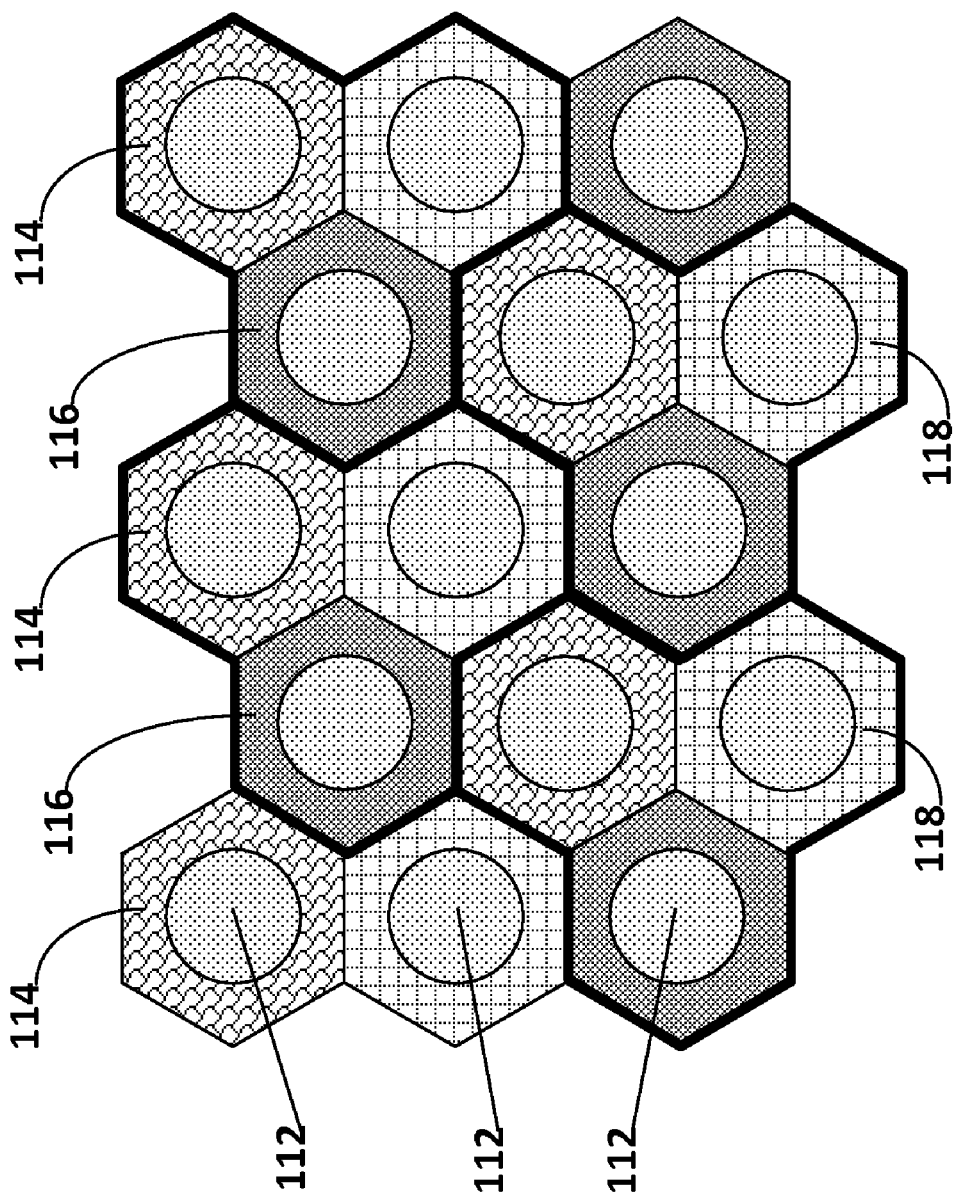
FIG. 1B is a schematic of a cellular network layout using the frequency spectrum partitioning shown in FIG. 1A with the cell clustering highlighted according to prior art.
Figure 1C:
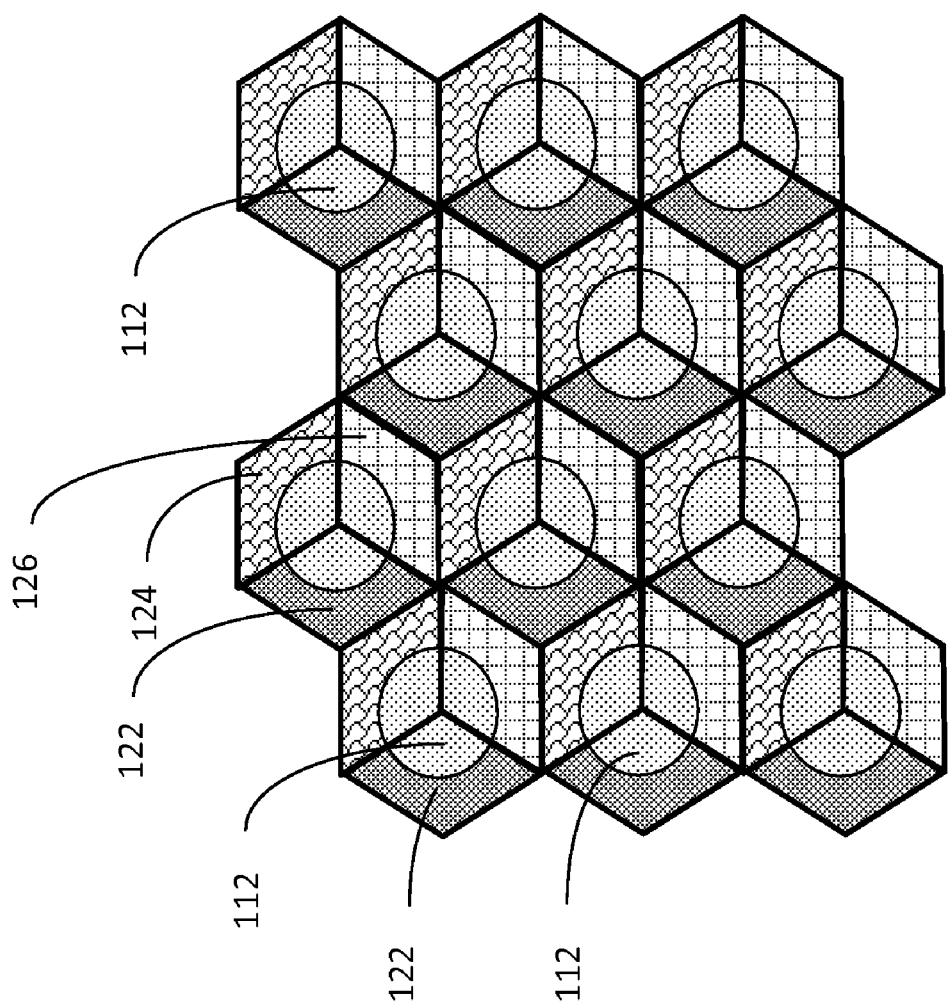
FIG. 1C is a schematic of a tri-sectored cellular network layout using the frequency spectrum division shown in FIG. 1A with sector clustering highlighted according to prior art.
Figure 2A:
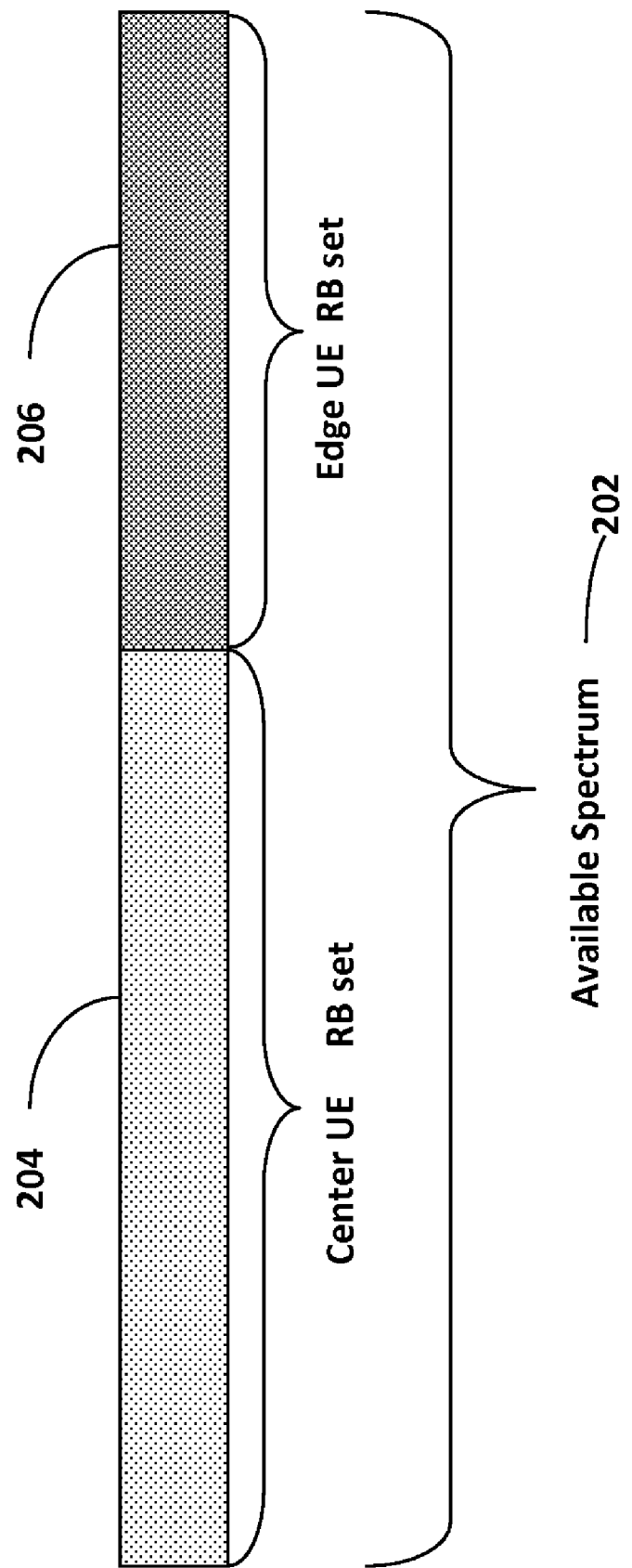
FIG. 2A shows frequency spectrum partitions according to an embodiment of the invention.

FIG. 2A shows a partitioning of an available frequency spectrum according to embodiments of the invention. An available frequency spectrum 202 is partitioned into two non-overlapping parts: the center UE frequencies 204 for serving UEs near to the serving base station (center UEs), and edge UE frequencies 206 for serving UEs close to the edges of the serving cell (edge UEs). The partitions are for resource block (RB) sets, i.e., resource units, used by the UEs.

Figure 2B:
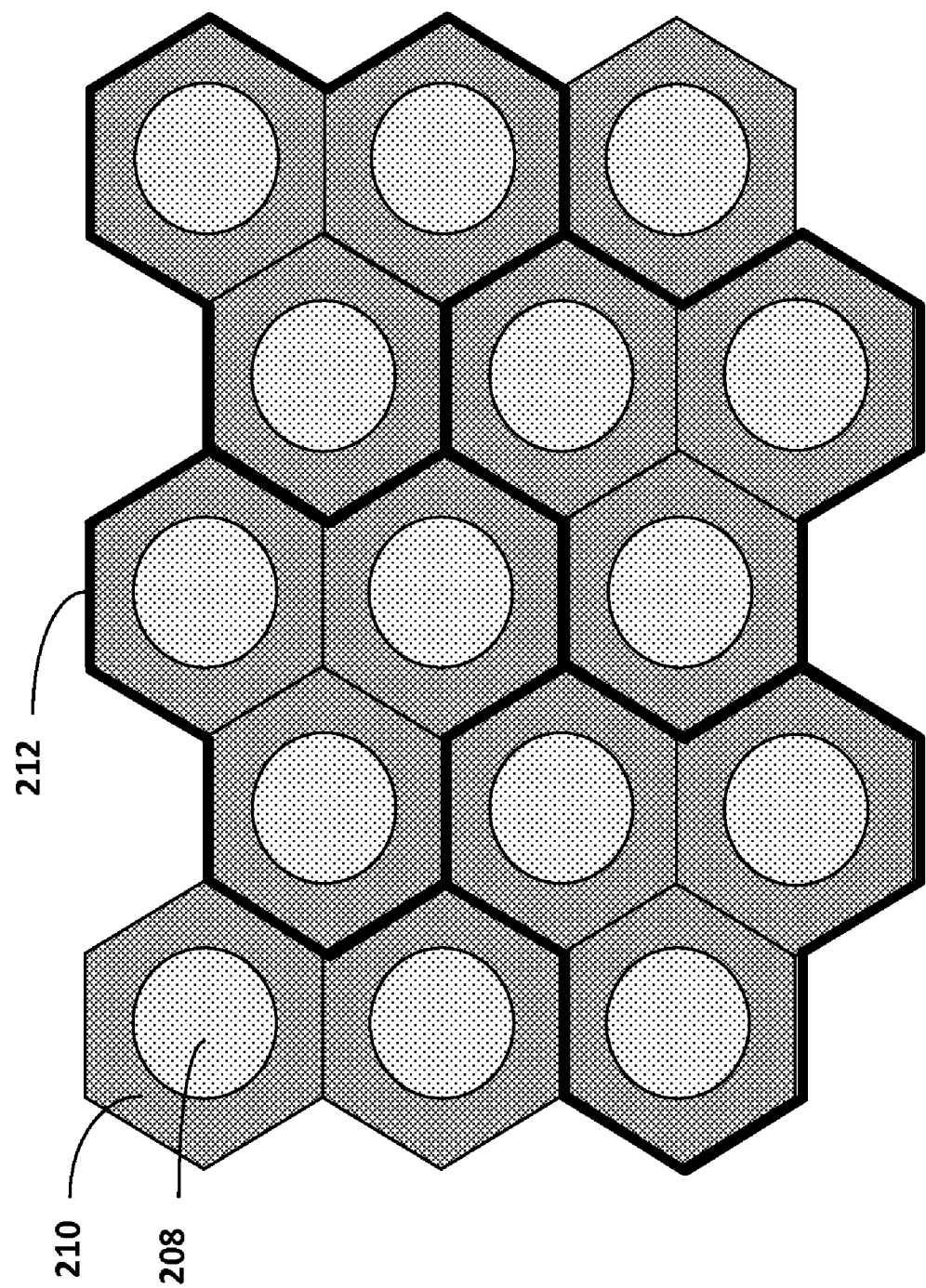
FIG. 2B is a schematic a cellular network layout using the frequency spectrum division according to an embodiment of the invention shown in FIG. 2A with the cell clustering highlighted.
Figure 2C:
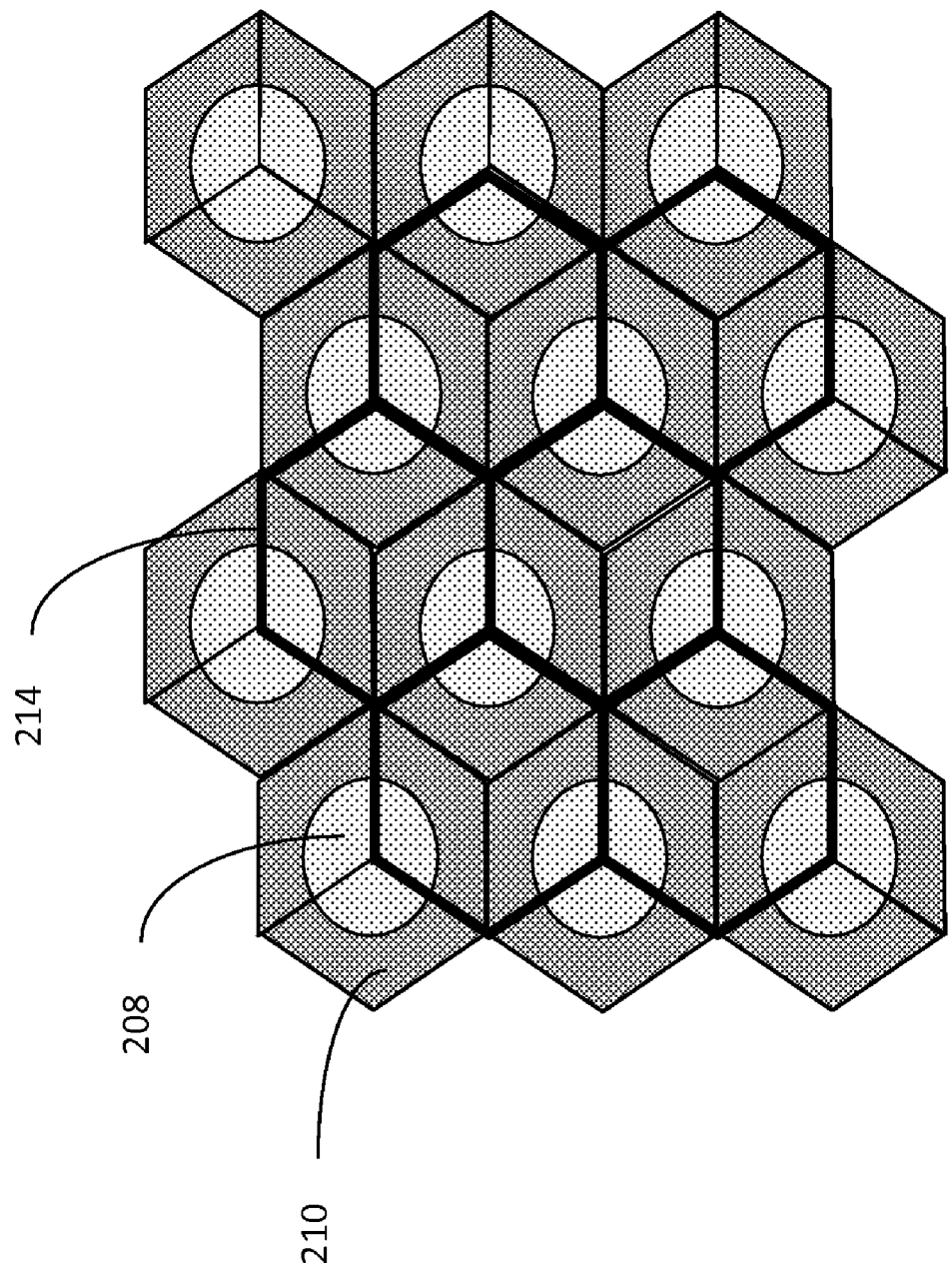
FIG. 2C is a schematic of clusters of three adjacent sectors in a tri-sectored cellular network, according to an embodiment of the invention.

FIG. 2B shows an example of cellular planning using the frequency spectrum partitioning scheme shown in FIG. 2A. Each cell includes a center region 208 and a cell edge region 210. A cell cluster is a predefined group of adjacent cells. A cell cluster 212 of three cells per cluster is shown. For each cell, the base station serves its center UEs using center UE RBs 204, and serves edge UEs using edge UE RBs 206.

FIG. 2B shows an example of cellular planning using the frequency spectrum division scheme shown in FIG. 2A where each cell has three sectors. Each sector includes of a center region 208 and an edge region 210. A cluster 214 of three sectors per cluster is shown. A cluster in a tri-sectored cellular network is a predefined set of adjacent sectors from different cells. A center UE is served using center UE RBs 204, while the edge UE is served using edge UE RBs 206.

For UE k, the received vector for a particular OFDM sub-carrier can be modeled by the equation $$\underline{r_k} = \sum_{b=1}^{B} H_{bk}\underline{s_b} + \underline{n_k},$$

where $r_k$ is a vector of size $M_R \times 1$, and contains the received signal at each of the receive antenna of UE k, $s_b$ is the $M_T \times 1$ vector of transmitted data symbols from base station b, $n_k$ is the $M_R \times 1$ vector of additive noise for UE k, $H_{bk}$ is the $M_R \times M_T$ channel matrix for the channels from transmit antenna of base station b to each receive antenna of UE k, where B is the total number of base stations.

The transmitted symbol s contains the modulated data symbols. A modulated data symbol can be, for example, a QPSK symbol represented two bits, or a 16-QAM symbol representing four bits.

Given the received signal $r_k$, estimates for the signal s can be obtained using different types of receivers, including but not limited to zero-forcing (ZF), minimum mean square error (MMSE), and maximum likelihood (ML) receivers.

Figure 3A:
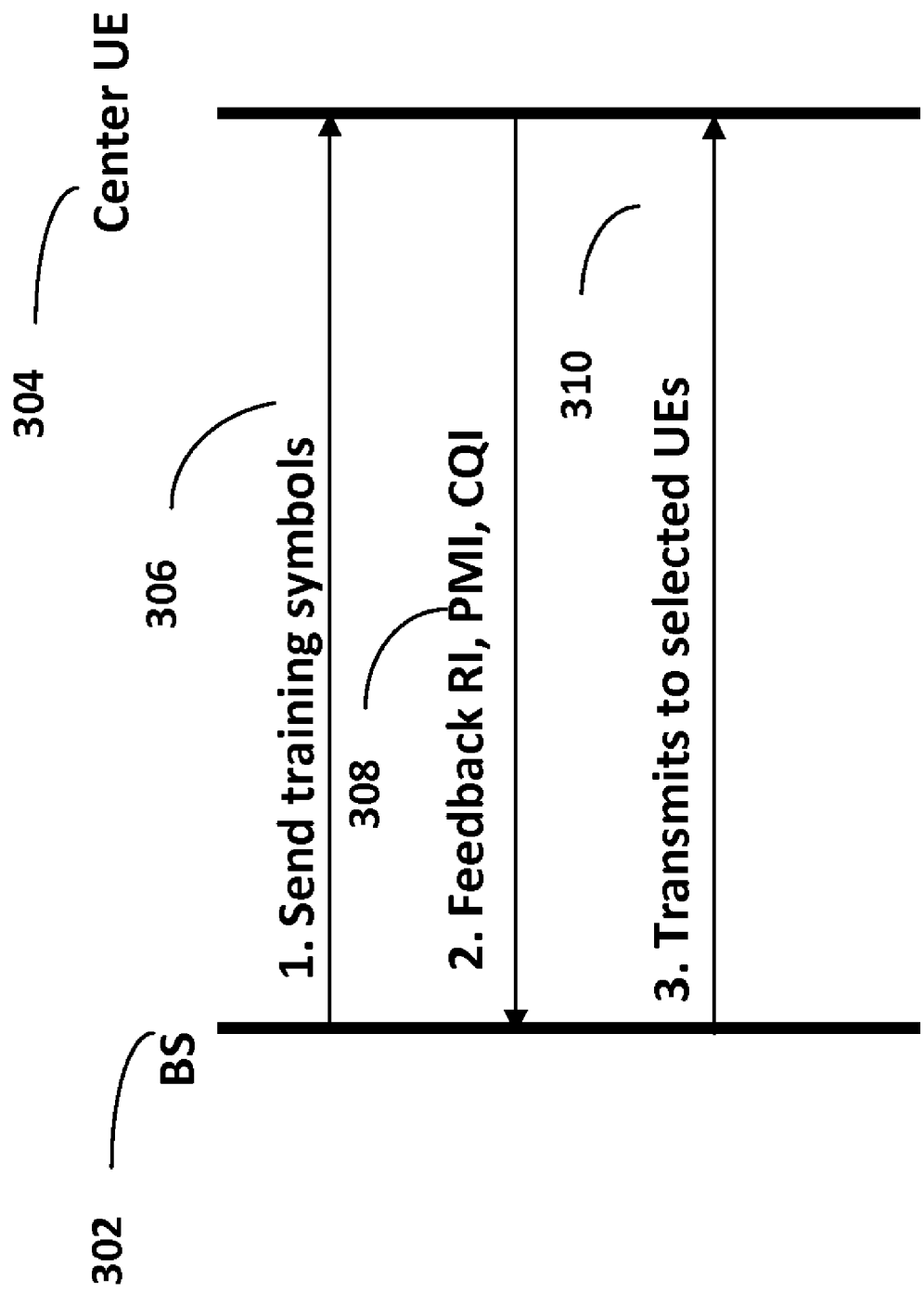
FIG. 3A is a timing diagram of a transmissions for a cell center UE according to an embodiment of the invention.

FIG. 3A shows the timing of signaling events between a center UE 304, and the associated BS 302. In the first step 306, the BS 302 transmits training symbols, i.e., pilots or reference signals, to UE 304, and the UE 304 estimates of the channel based on these signals.

Then, the UE 304 selects a suitable rank indicator (RI, which ranges from one to a maximal number of supportable transmission layers. Usually, for a MIMO network using spatial multiplexing, the RI corresponds to a minimal number of transmit and receive antennas, i.e., $\min(M_T, M_R)$.

The UE also selects a precoding matrix indicator (PMI), usually from a codebook known to both UE 304 and BS 302. UE 304 achieves this by, for example, finding the PMI that maximizes the ergodic achievable rate, maximizes the throughput with a tolerable error rate, or maximizes SINR, among other possible techniques.

UE 304 also determines a channel quality indicator (CQI), e.g., the SINR, recommended spectral efficiency, or modulation and coding scheme (MCS). Both CQI and PMI can correspond to each RB or some combination thereof. The CQI is usually quantized, and therefore, a set of CQI values can be predefined, and the corresponding value of CQI can be reported in the network. In the second step 308, UE 304 feeds back the RI, PMI and the CQI to BS 302. Finally, in step three 310, BS 302 selects the set of cell center UEs to transmit data to based on the group of UEs with a highest sum of achievable rates.

The feedback of the RI, the CQI and the PMI from the UEs to their serving BS need not be transmitted immediately, nor do they need to be carried out for each instance of channel use. Feedback can be scheduled on semi-static (slow), or dynamic (fast) basis. The feedback can also be periodic, with some pre-defined periods or aperiodic, e.g., based on some request form a higher layer.

Figure 3B:
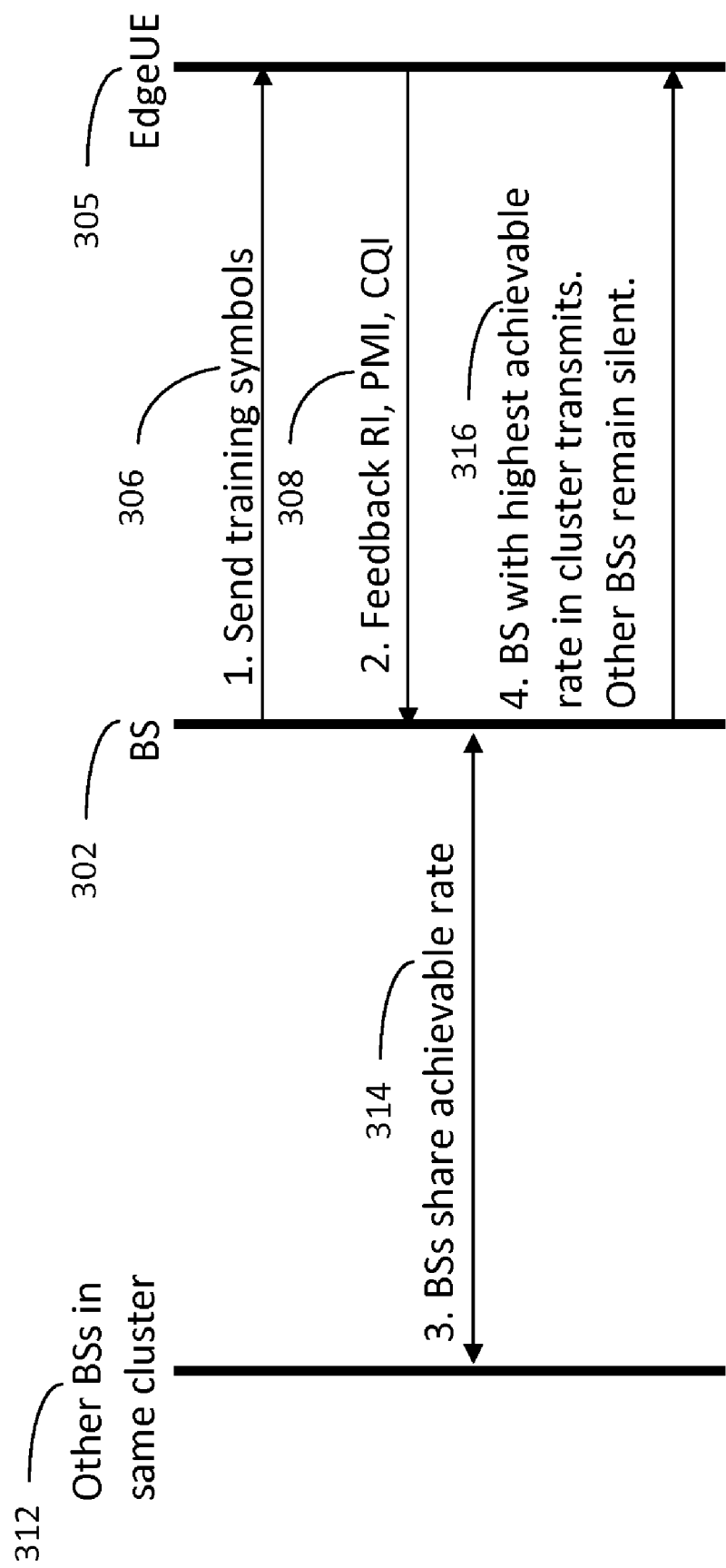
FIG. 3B is a timing diagram of a processing sequence of transmissions for a cell edge UE according to an embodiment of the invention.

FIG. 3B shows the timing of signals between an edge UE 305 and its serving BS 302, and between BS 302 and other BSs 312 in the same cluster. Similar to the signaling between cell center UE and its BS as shown in FIG. 3A, the BS 302 transmits training symbols to UE 305 in the first step 306, and the UE 305 determines the RI, the PMI and the CQI. Then, the UE 305 feeds back the RI, PMI and CQI to BS 302 in step two 308. With the available feedback, the BS 302 determines a highest achievable rate for the set of UEs in the edge region of its cell, on a RB basis. In the third step 314, the BS 302 communicates the highest achievable rate with other BSs 312 in the same cluster. Each cluster selects the cell with the highest achievable rate to transmit, for each RB, in step four 316, while other cells in the cluster do not use that RB to transmit to their cell-edge UEs.

Each BS has an average power constraint P. Different power levels can generally be assigned to each UE per RB usage. By using the same average power P to transmit each RB, an embodiment of the invention uses the same average power P as the corresponding fractional frequency reuse network with the same cluster size. This is because, on an average, each cell or sector uses the same number of RBs as the fractional frequency reuse method with the same cluster size.

An opportunistic cell edge selection scheme benefits from multi-cell diversity. Multi-cell diversity is a gain in total transmission rate of a cellular network when the cell with the highest rate is selected amongst a group of candidate cells or clusters.

Therefore, the opportunistic cell edge selection scheme achieves higher cell-edge throughput, and improves the SINR at cell-edge UEs compared to conventional fractional frequency reuse schemes.

Figure 4:
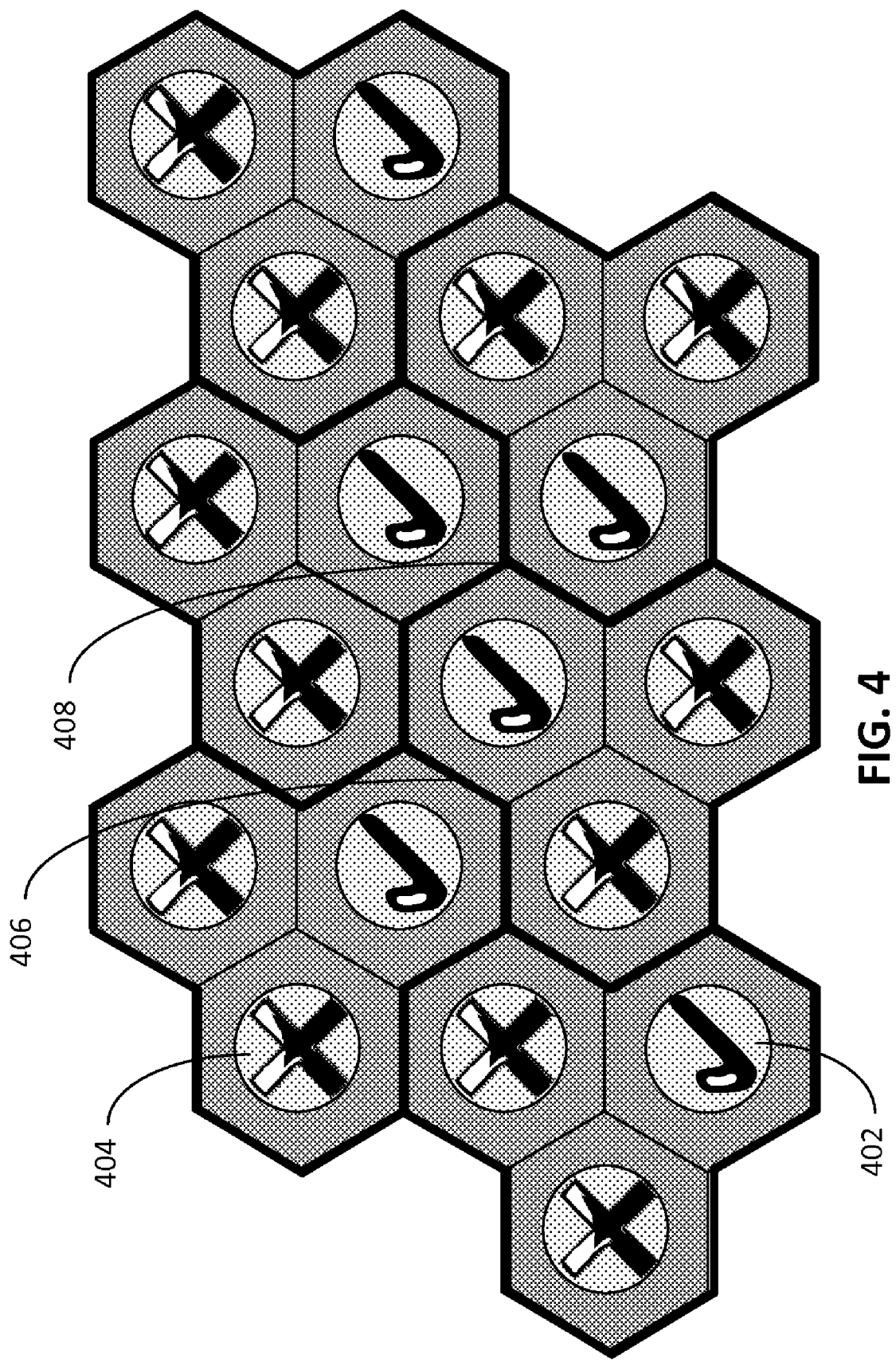
FIG. 4 is a schematic of the cellular layout after deciding which cells can or can not transmit to its cell edge UEs using a given edge RB according to an embodiment of the invention.

FIG. 4 shows example cells selected to transmit to their edge UEs using a given edge RB (with checkmarks 402) and cells selected not to transmit to its edge UEs using the same edge RB (with cross marks 404). As shown, there are instances when two adjacent cells are selected by adjacent clusters 406, and the case when three adjacent cells are selected by the three adjacent clusters 408. Selecting adjacent cells to transmit to their edge UEs independently and simultaneously can lead to significant amount of ICI on the edge RB. The network ignores other clusters, and cell selection is independent from one cluster to the next cluster.

Figure 5:
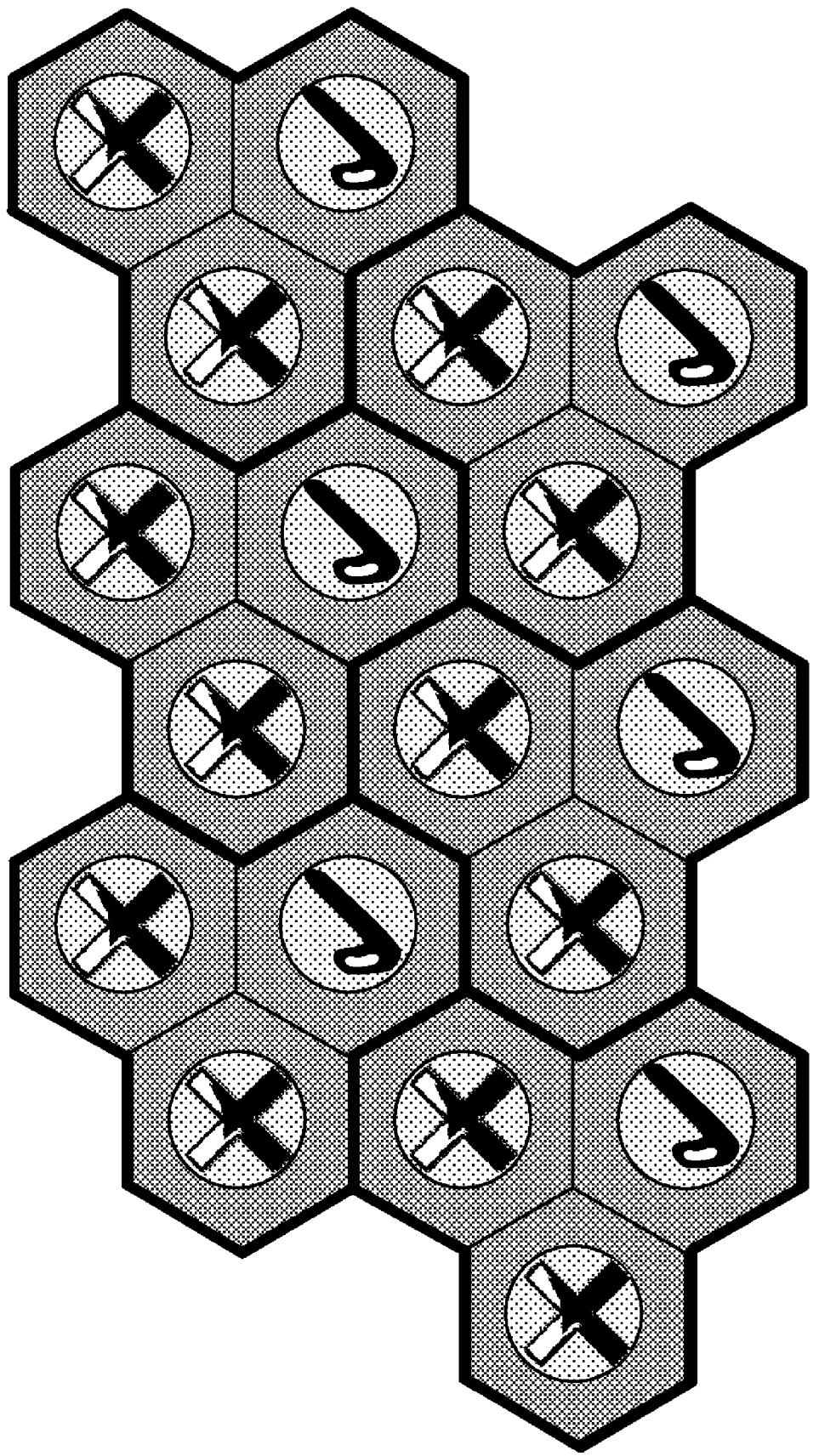
FIG. 5 is a schematic of the cellular layout after deciding which cells can or can not transmit to its cell edge UEs using a given edge RB, while constraining the cells that can transmit to its cell edge UEs to be in the same position of cluster according to an embodiment of the invention.

FIG. 5 shows cells that selected for transmitting to their edge UEs, using a given edge RB, reside in the same position in all clusters. To achieve this selection scheme, all clusters in a region, or a few of adjacent clusters, collectively determine on the cell position within each cluster to allow transmission to its edge UEs for given edge RB. A group of adjacent clusters can exchange achievable rates in each of the cell positions within the cluster, and collectively agree on the same cell position within the cluster to allow transmission to cell edge UEs using a given edge RB. The method enforces a minimal interference distance between cells that transmit to cell edge UEs using a given edge RB by decreasing the selection degrees of freedom. When the scheme is applied in a sectorized cellular network, the operation is analogous to the non-sectorized version.

Figure 6:
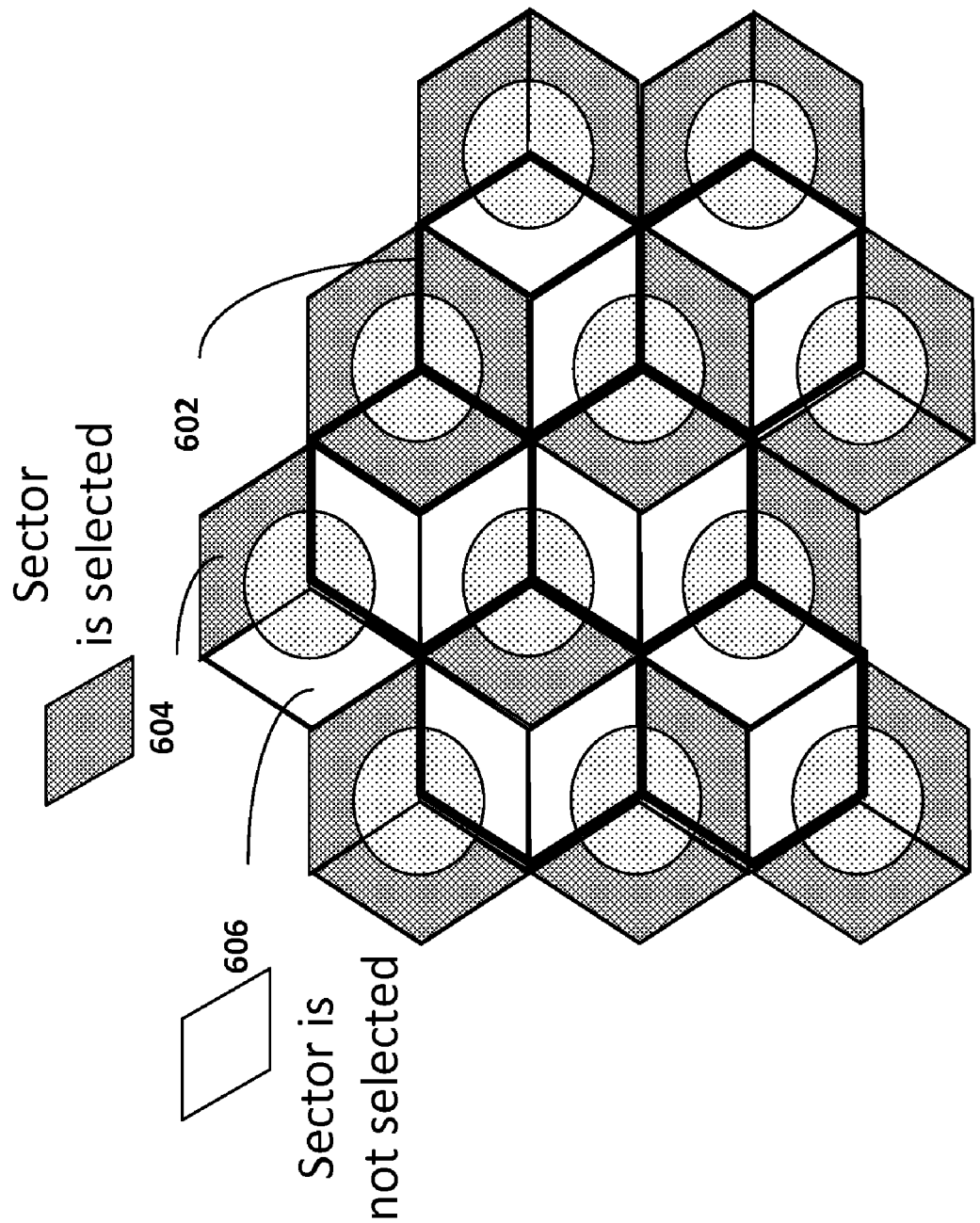
FIG. 6 is a schematic of the cellular layout after deciding which sectors can or can not transmit to its edge UEs using a given edge RB according to an embodiment of the invention.

As shown in FIG. 6, each cluster comprises three adjacent sectors from three adjacent cells. A sample cluster is highlighted as 602. Every sector transmits to its center region UEs independently, while only one of the three sectors 604 in each cluster can transmit to its edge region UEs for a given edge RB. The other two sectors 606 cannot transmit to their edge region UEs using the same edge RB.

For a tri-sectored cellular network, adjacent sectors of the same cell can concurrently use the same frequency spectrum. This is less problematic than the non-sectorized setup. This is because cellular sectors typically use directional antennas, which generate less ICI to adjacent sectors of the same cell.

Figure 7:
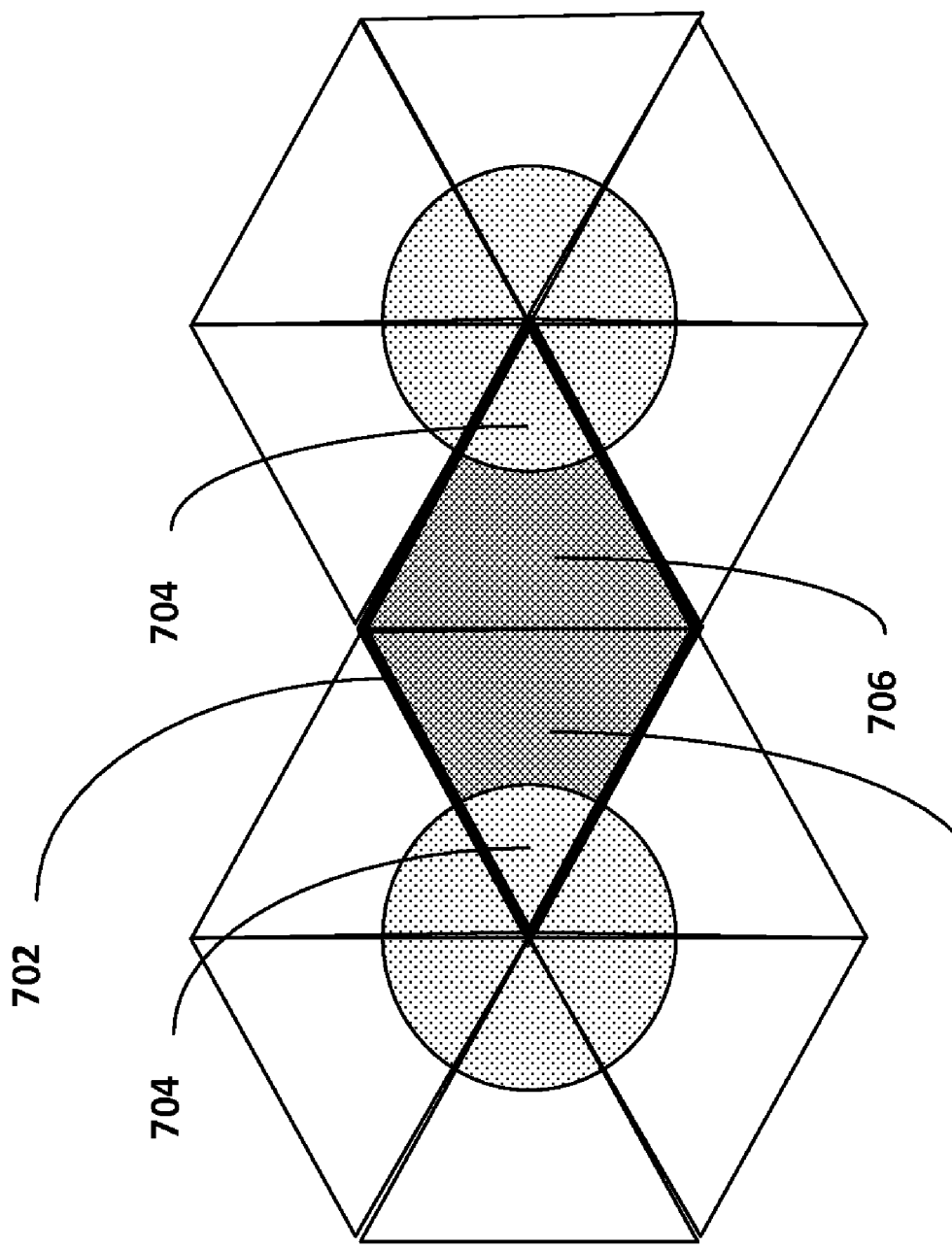
FIG. 7 is a schematic of a 6-sectored network where the sector with higher edge UE throughput is selected from the two adjacent sectors of two adjacent cells according to an embodiment of the invention.

As shown in FIG. 7, this scheme can also be applied to a 6-sectored cellular network. A cluster 702 is defined as the two adjacent sectors 706 of their two respective cells. These two sectors jointly schedule the available edge RBs by providing the edge RB to the sector with higher achievable rate.

Figure 8:
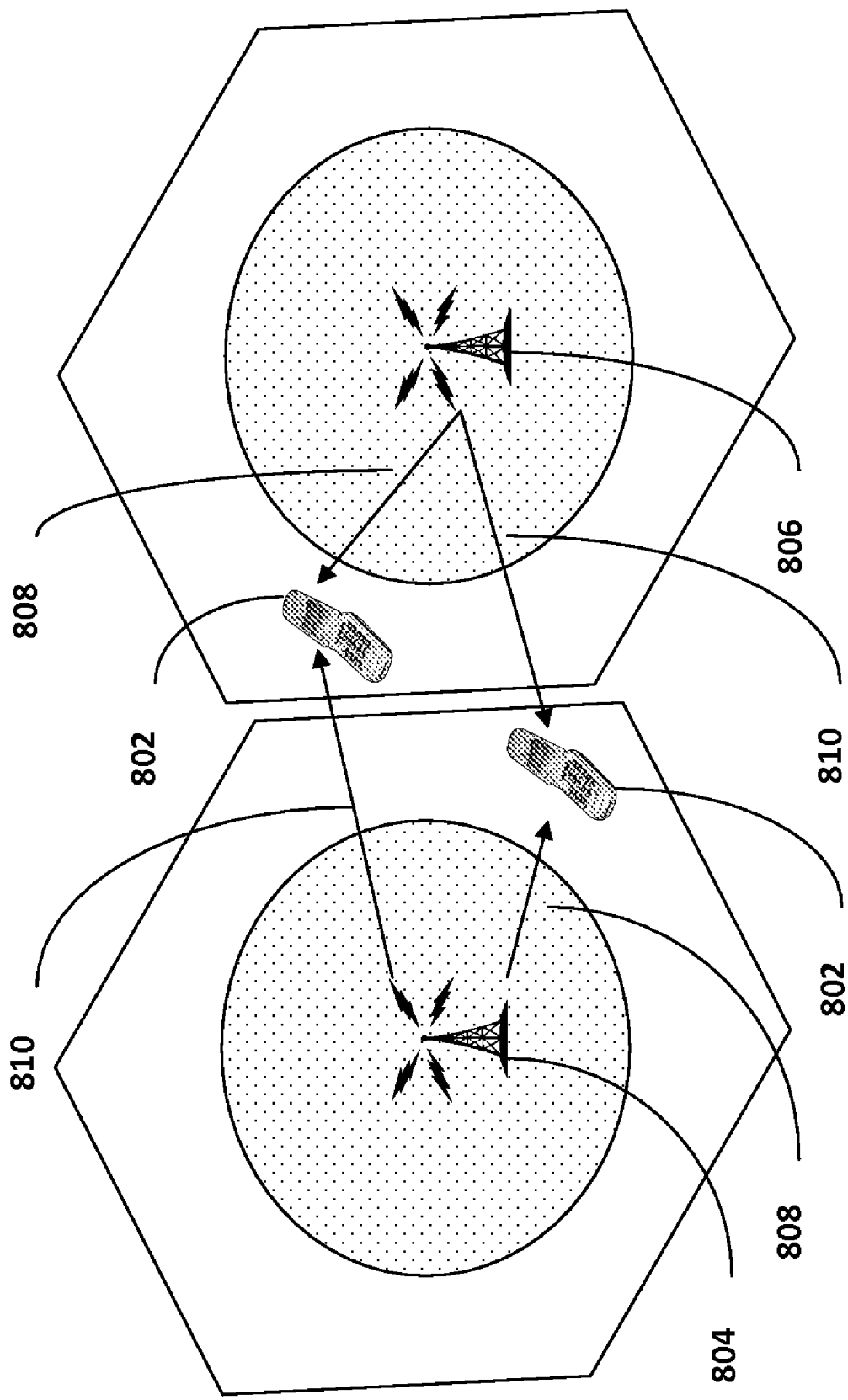
FIG. 8 is a schematic of a network where collaborative MIMO is used according to an embodiment of the invention.

As shown in FIG. 8, a third way to handle selecting adjacent cells is to exploit the ICI instead of avoiding it. Two adjacent cells are both selected to transmit to their cell edge UEs using a given edge RB. Collaborative MIMO involves both BS 804 and BS 806 to cooperatively transmit to UEs 802.

This collaboration can be: both BS transmit to both UEs simultaneously; or each BS serves its own UE. To implement either of these collaboration methods, the two base stations need to have an estimate of the channels to the UE in its own cell 808, and the channel between to the UE in the adjacent cell 810.

The two base stations acquire these channel estimates by requiring UE to quantize the channel from the adjacent BS, and feedback in step 308. Alternatively, the BS can request that only required UEs feedback quantized channels from the adjacent BS, after deciding which cells are adjacent and can benefit from collaborative MIMO technique.

All of these methods select the UE with the best channel for a particular RB. This approach can deprive certain cells and UEs opportunities to be served. This can be compensated for by adding a fairness mechanism to the scheduler module, where the decision is made on which cell and UEs are allowed to transmit, to takes into account fairness.

An example of such a fairness scheduler is a proportionally fair scheduler, where the scheduler selects a rate-maximizing cell and UE, while guaranteeing that each cell and UE has a minimal probability of being served.

In an OFDMA network, this procedure can be applied to groups of RBs. For example, four RBs are considered at a time, and the cell or sector with the highest sum rate on the four RBs transmits to its edge UEs using this RB group, while other cells or sectors of the same cluster do not use the same block of four RBs. This implementation provides a range of possible spectral sharing granularities and different levels of requirements for feedback traffic. The finer the granularity, the better the performance.

One further variation of the scheme is to determine the sum-rate optimal RB group rotation. For example, in the tri-sectored cellular network, where the cluster size is three sectors, three pairs of edge RBs (six edge RBs in total) are considered a pair at a time. A rotation involves finding the best assignment of the three edge RB pairs to the three sectors with one pair of edge RBs per sector. The number of RBs per sector or cell to consider for rotation can be any number of RBs up to the total available number of edge RBs dividing by the cluster size.

EFFECT OF THE INVENTION

Opportunistic cell-edge selection (OCES), as described herein, is a performance driven method. By scheduling edge UEs from three neighboring sectors using a communal set of edge RBs through a rate-maximization approach, the OCES scheme provides higher throughput performance than the one achieved by a prior art method, see U.S. patent application Ser. No. 12/335,379, "Method for Allocating Resources in Cell-Edge Bands of OFDMA Networks," filed by Teo et al., on Dec. 15, 2008, and incorporated herein by reference.

The OCES scheme does not rely on the use of channel indicators such as HII (high interference indicator), OI (overload indicator), TLI (traffic load indicator). It simply reports one metric, the achievable rate, for each RB (or set of RBs), either to a central scheduler or to the other two sectors in the same cluster.

There is neither negotiation nor signaling handshaking, unlike the scheme described by Teo et al, where some negotiation signaling is put in place to borrow and to reclaim a lent RB. Teo et al. capitalize on the unevenness of traffic load in different cells so that RBs in sectors with lower traffic can be lent to neighboring sectors with higher traffic. This scenario is automatically addressed in the cell edge selection scheme as described herein.

In fully loaded traffic scenarios, i.e., when all the edge RBs of every sector are assigned to edge UEs, the scheme described by Teo et al. stalls, meaning that there is no borrowing or lending of RBs that can take place anymore, because all the cell-edge RBs are already experiencing high interference.

In contrast, faced with a similar situation, the OCES scheme can still accommodate new UEs that require service entering the cell, even when the network is fully loaded. Indeed, any such edge UE enters the "competition pool" and is served if its instantaneous channel conditions are better than those of other UEs. Hence, the OCES scheme achieves higher throughput through increased UE selection diversity.

OCES assumes no a priori partition of edge RBs as is the case in fractional frequency reuse (FFR) or Teo et al.

They imply a certain a priori partition of edge RBs. However, such an a priori partition exists and is the basis that defines the borrowing/lending mechanism. Borrowing or lending an RB implies that the RB belongs to a certain sector/cell in the first place.

In contrast, there is only one pool of edge RBs for each cluster of neighboring sectors in the OCES scheme. This single-edge-RB-pool setup is the key idea behind the higher selection diversity enabled by the OCES scheme.

Cell edge selection has a band-swapping (or RB swapping) variation that is also unique. To the best of our knowledge, the OCES scheme is novel, even more so is the band swapping idea. Band/RB swapping is not an option for Teo et al., i.e., it is impossible to achieve.

UEs in the OCES scheme make use of the RI (rank indicator) already defined in LTE to convey their achievable data rate to the eNB in the case of MIMO spatial multiplexing. As a rate-maximization driven scheme, OCES can better utilize the pool of available edge RBs to support MIMO which is not possible with either FFR based schemes. Although MIMO can be supported as an added option in both FFR schemes, it is an inherent feature of the OCES scheme, i.e., it is not an option, it is an integral part of the proposed scheme.

EXAMPLE SCENARIOS

Figure 9:
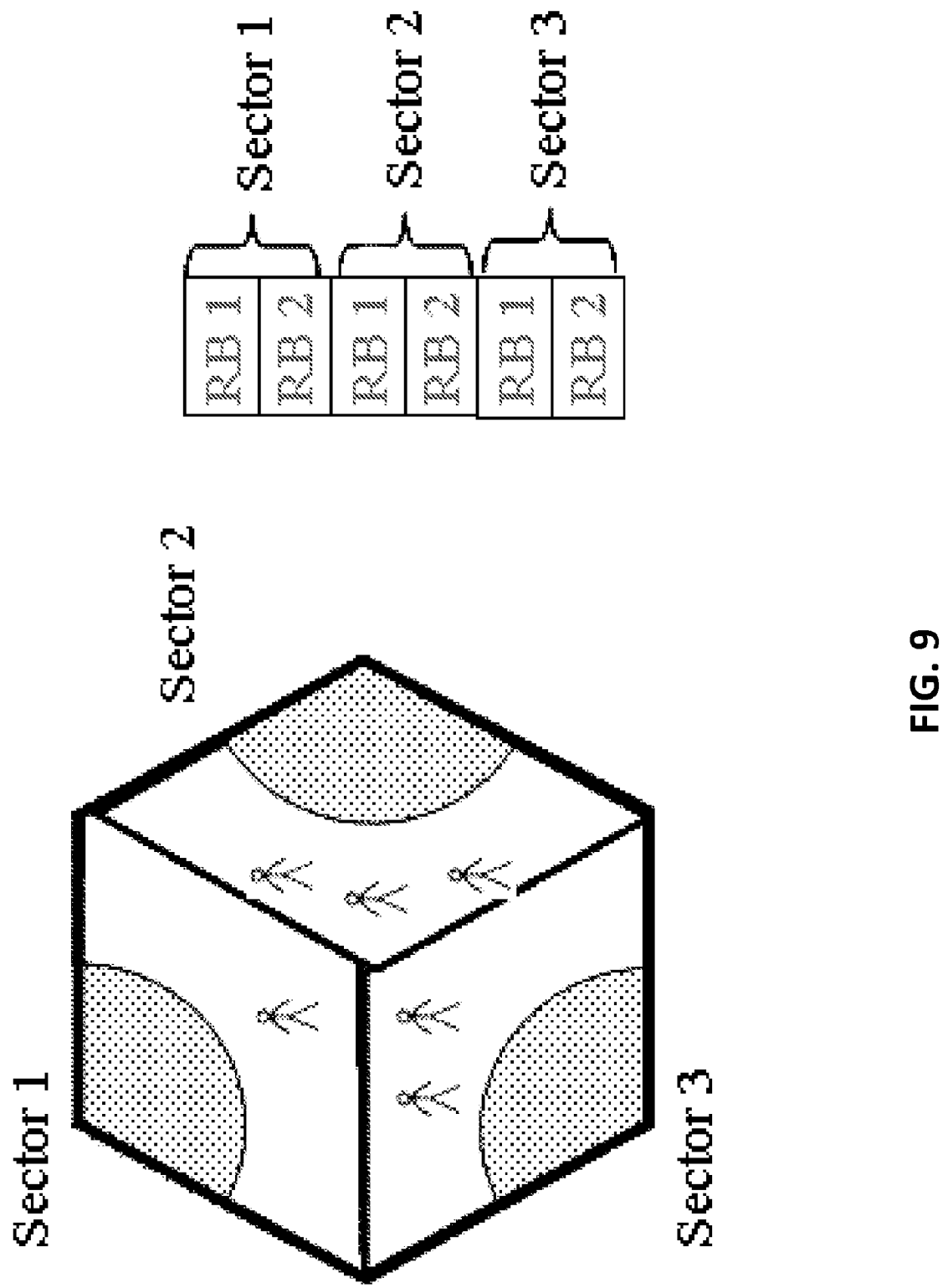
FIG. 9 is an example scenario of opportunistic cell-edge selection (OCES)

FIG. 9 shows an example scenario that can help highlight some of the differences between the FFR-based and OCES ideas. Consider a simplified scenario with a single cluster of three sectors, each sector having two edge RBs available. For this cluster of three sectors, there are six edge RBs to allocate. Consider, for a particular instant, there is one edge UE in sector 1, three edge UEs in sector 2, and two edge UEs in sector three.

FIG. 10 shows the achievable rate for each sector in each of the six RBs. We set a limit of allocating at most one RB per UE.

FIG. 11 shows the conventional FFR scheme with fixed allocation, no cooperation. RB 1 of Sector 1 is unassigned, while UE 1 of Sector 2 gets nothing.

FIG. 12 shows the allocation according to Teo et al. The allocation is the same as for as FFR, except that UE 1 of Sector 2 borrowed RB 1 from Sector 1, and the total achievable rate is 18.

FIG. 13 shows the allocation according to the OCES scheme as described herein. Now, the total achievable rate is 21.

Clearly, the OCES scheme as described herein achieves the highest throughput.

In summary, although the three schemes, FFR, Teo et al., and OCES, try to come up with solutions that improve the cell-edge performance. Teo et al., can probably be best described as a dynamic FFR scheme. A scheme whereby a lending/borrowing mechanism is defined on top of FFR, or as a complement to FFR, in order to enhance the latter by making it more dynamic, and adjustable to uneven traffic and load variations between neighboring sectors/cells. In doing so, Teo et al., provide an interpretation and a use case for some ICIC indicators that have been defined in LTE (HII, OI, TLI).

In contrast OCES does not rely on any pre-defined ICIC indicators, nor does it need to. Rather, OCES aims to exploit the clustering idea by defining one single set of cell-edge RBs per cluster in order to provide more UE selection diversity, therefore achieving a higher throughput per cluster in an opportunistic manner.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for allocating resources in an orthogonal frequency division multiple access (OFDMA) network, wherein the resources include a radio frequency spectrum of subcarriers partitioned into resource blocks of sets of the subcarriers, and wherein the network including a set of cells or sectors, wherein cluster includes a set of adjacent cells or adjacent sectors, and wherein each cell or each sector includes a base station for serving a set of user equipment (UEs) in the cell or sector, comprising:

partitioning each set of UEs in each cell into a set of cell-center UEs and a set of cell-edge UEs;

reserving, for each base station, a cell-center bandwidth for allocation to the set of cell-center UEs;

reserving, for each base station, cell-edge bandwidth for allocation to the cell-edge UEs;

allocating a total cell-center bandwidth to the cell-center UEs in each cell of each cluster; and sharing the cell-edge bandwidth between the cell-edge UEs in a given cluster, wherein the set of UEs communicate with the base stations, and the base stations communicate with the other base stations in the cluster, and further comprising:

transmitting, by each base station, training signals to the set of UEs in the cell;

estimating a quality of channels between the BS and the set of UEs based on the training signals;

feeding back the quality of the channel to the base station;

determining UEs having a highest performance metric for each resource block to allocate;

transmitting, by each base station in the cluster, the performance metric to a scheduler;

allocating, by the scheduler, the resource blocks to the base stations;

transmitting data from the base stations to the set of UEs according to the allocating by the scheduler.

2. The method of claim 1, wherein the quality of the channel uses a finite number of bits.

3. The method of claim 1, wherein each base stations in the cluster transmits the performance metric to the scheduler for each resource, and the base stations transmit to the scheduler the performance metric on a first allocated resource, and the scheduler makes an allocation decision and informs the base stations, and the base stations transmit to the scheduler the performance metric on a second allocated resource, and the scheduler makes another allocation decision and informs the base stations, and the iteration of base stations transmitting performance metrics to scheduler and the scheduler making an allocation decision and informs the base stations continues until all of the resources are allocated.

4. The method of claim 1, wherein each scheduler resides within a cell, a sector, or a cluster.

5. The method of claim 1, wherein the performance metric includes a signal-to-interference-and-noise ratio, and/or an estimated achievable rate.

6. The method of claim 1, wherein the resources are assigned to the cell in the cluster with a highest performance metric.

7. The method of claim 1, wherein the resource allocation assigns a set of resources to the cells in the cluster, and wherein each cell is allocated at least a predetermined number of resource blocks and achieves a highest performance metric using the predetermine number of cells.

8. The method of claim 1, wherein the cell-center bandwidth reserved for the center region and the cell-edge bandwidth reserved for the edge region are disjoint.

9. The method of claim 1, wherein the cell-center bandwidth reserved for center region of a particular cell and the cell-edge bandwidth reserved for the edge region of an adjacent cell are disjoint.

10. The method of claim 9, wherein the allocation is adaptive to traffic load and channel quality.

11. The method of claim 1, further comprising:
partitioning each cell into a set of sectors.

12. The method of claim 1, wherein the cell-edge bandwidth allocated to a particular cell or sector in a cluster and the cell-edge bandwidth allocated to another cell or sector in the same cluster are disjoint.

13. The method of claim 1, wherein the cell-edge bandwidth allocated to a particular cell or sector in a cluster and the cell-edge bandwidth allocated to another cell or sector in a different cluster overlap.

14. The method of claim 1, wherein the cell-center bandwidth and the cell-edge bandwidth are each defined by a start frequency and an end frequency.

15. The method of claim 1, wherein the cell-center bandwidth and the cell-edge bandwidth are each defined by a centre frequency and a corresponding bandwidth.

16. The method of claim 1, wherein the cell-center bandwidth and the cell-edge bandwidth are each defined by a number of resource blocks and corresponding logical locations within the logical bandwidth.

17. The method of claim 16, further comprising a number of resource blocks designated as a size of a smallest unit of resource allocation.

18. The method of claim 17, wherein a result of the resource allocation performed by each base station allocates the cell-edge resource blocks in each cluster exclusively to one cell or sector of the cluster.

\* \* \* \* \*